(12) United States Patent
Iiduka et al.

(10) Patent No.: US 11,186,166 B2
(45) Date of Patent: Nov. 30, 2021

(54) FUEL TANK VENTILATION VALVE

(71) Applicant: KYOSAN DENKI CO., LTD., Koga (JP)

(72) Inventors: Naoki Iiduka, Koga (JP); Yuko Kurosawa, Koga (JP)

(73) Assignee: KYOSAN DENKI CO., LTD., Koga (JP)

( * ) Notice: Subject to any disclaimer, the term of this patent is extended or adjusted under 35 U.S.C. 154(b) by 88 days.

(21) Appl. No.: 16/578,443

(22) Filed: Sep. 23, 2019

(65) Prior Publication Data

US 2020/0101836 A1 Apr. 2, 2020

(30) Foreign Application Priority Data

Sep. 27, 2018 (JP) .............................. JP2018-182143
Aug. 23, 2019 (JP) .............................. JP2019-153139

(51) Int. Cl.
*B60K 15/035* (2006.01)
*F16K 31/22* (2006.01)
*B60K 15/03* (2006.01)

(52) U.S. Cl.
CPC ........ *B60K 15/03519* (2013.01); *F16K 31/22* (2013.01); *B60K 2015/03289* (2013.01)

(58) Field of Classification Search
CPC .... B60K 15/03519; B60K 2015/03289; F16K 31/22

See application file for complete search history.

(56) References Cited

U.S. PATENT DOCUMENTS

| 4,887,578 | A | * | 12/1989 | Woodcock | ....... | B60K 15/03504 |
| | | | | | | 123/519 |
| 5,392,804 | A | * | 2/1995 | Kondo | ............. | B60K 15/03519 |
| | | | | | | 123/519 |
| 5,535,772 | A | * | 7/1996 | Roetker | ........... | B60K 15/03519 |
| | | | | | | 137/202 |
| 5,577,526 | A | * | 11/1996 | Kasugai | ........... | B60K 15/03519 |
| | | | | | | 137/202 |
| 7,188,613 | B2 | * | 3/2007 | Miura | ................... | F16K 24/044 |
| | | | | | | 123/198 D |
| 2002/0017281 | A1 | * | 2/2002 | Crary | ............... | B60K 15/03519 |
| | | | | | | 123/516 |
| 2010/0051114 | A1 | | 3/2010 | Yamada et al. | | |
| 2019/0070954 | A1 | | 3/2019 | Mukasa et al. | | |

FOREIGN PATENT DOCUMENTS

JP 5018703 B2 9/2012
JP 2017-202804 A 11/2017

* cited by examiner

*Primary Examiner* — Kenneth Rinehart
*Assistant Examiner* — Patrick C Williams
(74) *Attorney, Agent, or Firm* — Harness, Dickey & Pierce, P.L.C.

(57) ABSTRACT

A fuel tank ventilation valve includes a float valve, a float control mechanism, and a barrier member. The float valve includes a float and a float chamber. The float chamber is provided by a case. The float control mechanism controls the area of a fuel opening so that a fuel outflow speed from the float chamber is slower than a fuel inflow speed into the float chamber. The barrier member is located between an opening for a ventilation passage and the float. The barrier member suppresses fuel intrusion. The fuel tank ventilation valve is capable of preventing an outflow of a liquid component.

5 Claims, 5 Drawing Sheets

FUEL TANK VENTILATION VALVE

CROSS REFERENCE TO RELATED APPLICATION

The present application is based on Japanese patent application No. 2018-182143 filed on Sep. 27, 2018, and Japanese patent application No. 2019-153139 filed on Aug. 23, 2019, the entire contents of which are incorporated herein by reference.

FIELD

The disclosure herein relates to a fuel tank ventilation valve for venting a fuel tank.

BACKGROUND ART

When a fuel tank is shaken, a liquid level of a fuel will also be disturbed. For this reason, an outflow of a liquid component may not be suppressed. In another aspect, a fuel tank ventilation valve may have a ball valve which detects vibration of the fuel tank and enables the ventilation valve returns an open state when it detects the vibration. In some situation, the ball valve may need a long period of time to return to the open state. In this case, a ventilation passage may remain closed for the long period of time. In this case, an internal pressure of the fuel tank may become excessively high or excessively low.

SUMMARY

In view of the above or other aspects not mentioned, there is a need for further improvements in a fuel tank ventilation valve.

A fuel tank ventilation valve, disclosed herein, comprising: a float which floats on the fuel; a case for defining a float chamber for containing the float and storing fuel for floating the float; an on-off valve which closes a ventilation passage that communicates an inside and an outside of the fuel tank when the float floats and rises, and opens the ventilation passage when the float descends; a ventilation opening formed on the case and providing the ventilation passage; and a float control mechanism which is formed on the case below the ventilation opening and controls an inflow area (Ain) through which the fuel flows into the float chamber larger than an outflow area (Aout) through which the fuel flows out from the float chamber (Ain>Aout).

According to the disclosure, the fuel tank ventilation valve which opens and closes the ventilation passage in response to the fuel tank liquid level is provided. In addition, the inflow area and the outflow area with respect to the float chamber make the inflow area larger than the outflow area. For this reason, when the liquid level rises, an easy to close characteristic is given. On the other hand, when the liquid level is lowered, a hard to open characteristic is given. For this reason, even if the liquid level of the fuel tank fluctuates, the outflow of fuel to the ventilation passage can be suppressed.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

EMBODIMENT

Figure 1:
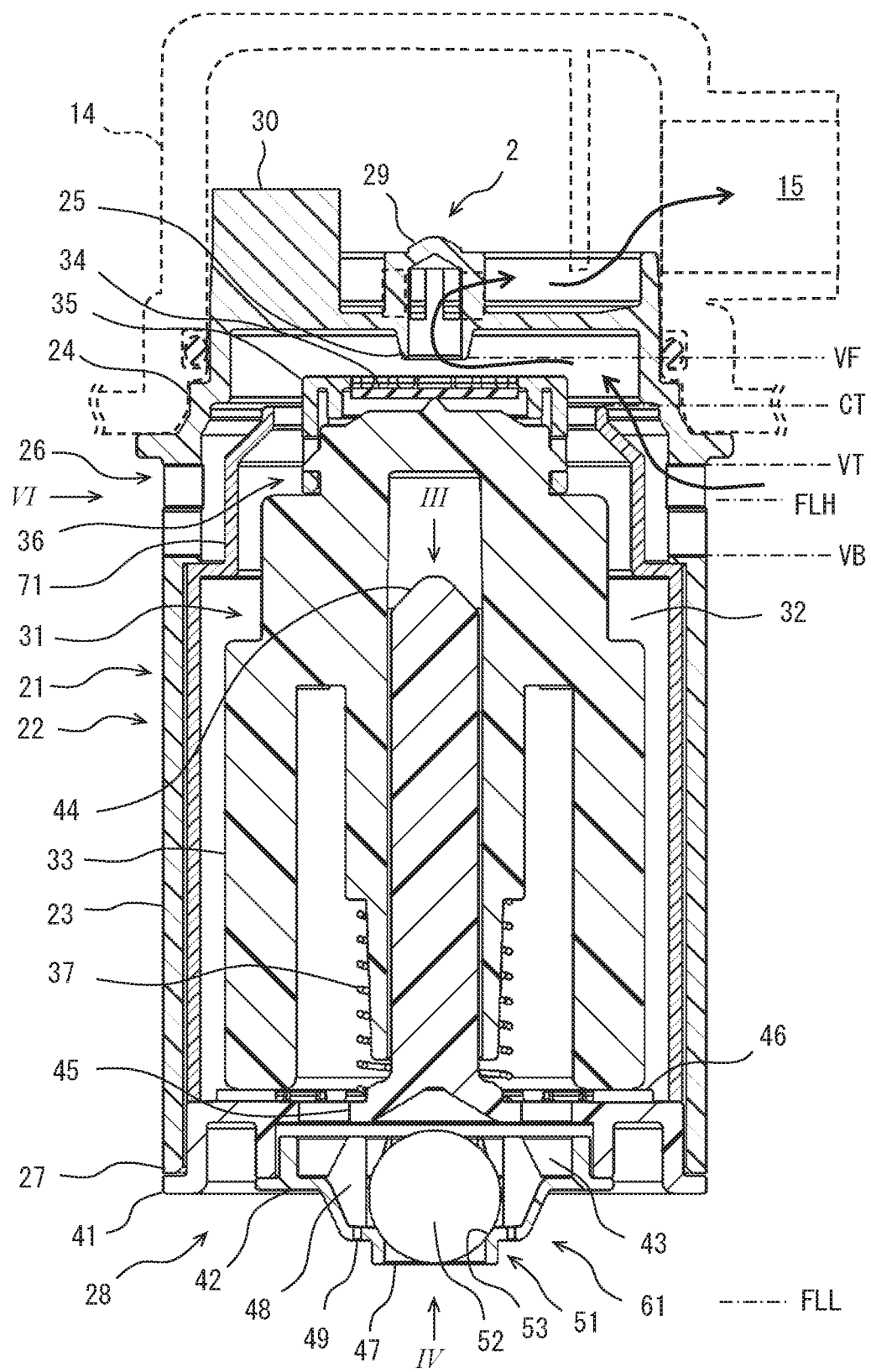
FIG. 1 is a cross-sectional view of a fuel tank ventilation valve according to a first embodiment.

Hereinafter, a plurality of embodiments will be described with reference to the drawings. In some embodiments, parts that are functionally and/or structurally corresponding and/or associated are given the same reference numerals, or reference numerals with different hundred digit or more digits. For corresponding parts and/or associated parts, reference can be made to the description of other embodiments.

First Embodiment

Fuel Supply System

Figure 2:
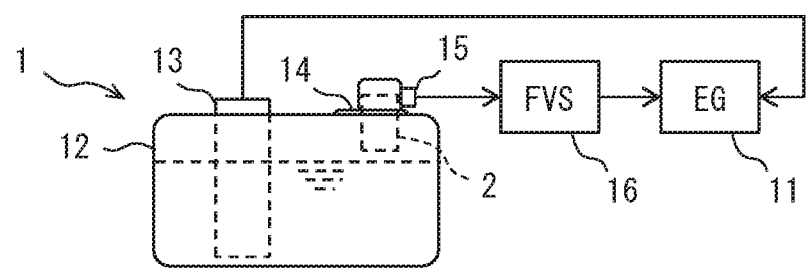
FIG. 2 is a block diagram of a fuel supply system.

FIG. 1 shows a fuel tank ventilation valve 2. The fuel tank ventilation valve 2 is also referred to as a ventilation valve 2 or a ventilation control valve. FIG. 2 shows a fuel supply system 1 to which the ventilation valve 2 is applied. In the following description, the terms "upper" and "lower" refer to directions defined with reference to the gravity. The term fuel refers to a liquid component unless otherwise specified. The gaseous component of the fuel is called fuel vapor. The term fuel vapor includes air. The ventilation passage is a passage for the fuel vapor and air.

In FIG. 2, the fuel supply system 1 supplies liquid fuel to an internal combustion engine (EG) 11. The internal combustion engine 11 provides a power source. The power source can be used for vehicles, power generation devices, pumping devices, air conditioners, and the like. In this specification, the term "vehicle" should be broadly interpreted as a term including a car, an aircraft, a ship, a simulation device, an amusement machine, and the like. The fuel supply system 1 includes a fuel tank 12 that stores fuel. The fuel supply system 1 includes a fuel pump 13 that supplies the fuel in the fuel tank 12 to the internal combustion engine 11. The fuel pump 13 may include a low pressure pump and/or a high pressure pump. The fuel pump 13 provides a fuel injection device.

The fuel supply system 1 includes an adjusting device for adjusting an internal pressure of the fuel tank 12. Furthermore, the fuel supply system 1 includes a vapor processing system that suppresses releases of the fuel vapor from the fuel tank 12 to the atmosphere. The vapor processing system includes a lid 14 of the fuel tank 12, a passage pipe 15, and a vapor processing device 16. The passage pipe 15 provides a ventilation passage. The passage pipe 15 communicates the fuel tank 12 and the vapor processing device 16. The vapor processing device 16 includes a charcoal canister that adsorbs the fuel vapor. The vapor processing device 16 includes a purge system that expels the fuel vapor from the charcoal canister toward the internal combustion engine 11. The vapor processing device 16 supplies the fuel vapor to the internal combustion engine 11. The vapor processing device 16 suppresses the release of the fuel vapor to the atmosphere by burning the fuel vapor within the internal combustion engine 11.

The ventilation valve 2 is provided between the fuel tank 12 and the passage pipe 15. The ventilation valve 2 closes the ventilation passage when the fuel level exceeds a predetermined level, i.e., a cut-off point. Thereby, the ventilation valve 2 suppresses a leakage of the liquid component to the ventilation passage. The ventilation valve 2 opens the ventilation passage when the fuel level is below a predetermined level. Thereby, the ventilation valve 2 enables the internal pressure of the fuel tank 12 to be adjusted. The predetermined level is similar to a full fuel level of the fuel tank 12.

Fuel Tank Ventilation Valve

Returning to FIG. 1, the ventilation valve 2 includes a float valve 21 and a float control mechanism 61. The float valve 21 includes a case 22 and a float 31. The case 22 defines and provides a float chamber 32. The float chamber 32 stores fuel for floating the float 31. The float chamber 32 is a cup-shaped container. The float chamber 32 accommodates the float 31. The float valve 21 opens and closes the ventilation passage according to the behavior of the float 31. The float 31 floats on the fuel. The float 31 floats on the fuel when the liquid level inside the fuel tank 12 rises and the fuel enters the float chamber 32. When the liquid level rises and reaches a predetermined level, the float 31 closes the ventilation passage. When the liquid level in the fuel tank 12 is lowered and the fuel is discharged from the float chamber 32, the float 31 descends while floating on the fuel. When the liquid level drops and reaches a predetermined level, the float 31 opens the ventilation passage.

The ventilation valve 2 includes a float control mechanism 61 for controlling behavior of the float 31. The float control mechanism 61 is formed in the case 22 below the opening for the ventilation passage. This opening is also referred to as a vent opening or a ventilation port. The float control mechanism 61 is provided below the case 22. The float control mechanism 61 is provided on the lower portion of the float chamber 32. The float control mechanism 61 controls an inflow of fuel into the float chamber 32 and an outflow of the fuel from the float chamber 32. The float control mechanism 61 controls the volumetric flow rate of the fuel flowing out of the float chamber 32 to be lesser in magnitude than the volumetric flow rate of the fuel flowing into the float chamber 32. The float control mechanism 61 controls the area of the fuel opening in the lower portion of the float chamber 32 so as to cause a difference between the volumetric inflow rate and the volumetric outflow rate of the fuel.

When the liquid level rises, the float control mechanism 61 assists the float valve 21 with a fast first response speed and closes the ventilation passage. When the liquid level drops, the float control mechanism 61 opens the ventilation passage with a second response speed that is slower than the first response. Moreover, the float control mechanism 61 does not substantially respond to the shaking of the fuel tank 12. Thereby, even if the fuel tank 12 shakes after the ventilation valve 2 is closed, the valve closed state is maintained. In addition, when the liquid level is lowered after the ventilation valve 2 is closed, the ventilation valve 2 is opened by the second response speed even if the fuel tank 12 does not shake.

The case 10 is made of resin. The case 22 has an upper case 23 and a lower case 28. The case 22 provides the float chamber 32 for accommodating the float 31. The float chamber 32 is also a container for storing fuel. The upper case 23 provides an intermediate portion or a trunk portion of the float chamber 32. The lower case 28 provides a bottom portion of the float chamber 32.

The upper case 23 is cylindrical. The upper case 23 protrudes from a wall of the fuel tank 12 toward an internal cavity of the fuel tank 12. The upper case 23 is suspended from the wall of the fuel tank 12 into the fuel tank 12.

The lower case 28 is provided in the opening 27 at the lower end of the upper case 23. The lower case 28 closes the opening 27 incompletely. The lower case 28 is joined to the upper case 23. The term "join" refers to a method of connecting a plurality of members. The term "join" includes bonding methods such as adhesion, screwing, welding, and brazing. The term "join" includes joints that can be disassembled and joints that cannot be disassembled without breaking. The lower case 28 is also called a valve case.

The case 22 has a connecting portion 24. The connecting portion 24 is provided on the upper case 23. The connecting portion 24 is also a part of a connecting mechanism for connecting the case 22 to the lid 14. The connecting portion 24 is connected to the lid 14 by a connecting mechanism such as a bolt or a snap fit. The term "connect" includes a fixed connection and a loose connection. The loose connection may allow small gaps or relative vibrations.

The case 22 provides a fixed valve seat 25 for the float valve 21. The fixed valve seat 25 is provided on the upper case 23. The fixed valve seat 25 is provided in the ventilation passage. The fixed valve seat 25 provides a valve seat for opening and closing the ventilation passage.

The float 31 includes a floating body 33. The floating body 33 is made of resin. The specific gravity of the floating body 33 allows the floating body 33 to float on the fuel. The float 31 includes a seal member 34 and a holder 35. The seal member 34 is a rubber plate. The seal member 34 is connected to the floating body 33 by the holder 35. The seal member 34 closes the ventilation passage by being seated on the fixed valve seat 25. The seal member 34 opens the ventilation passage by moving away from the fixed valve seat 25. The fixed valve seat 25 and the seal member 34, i.e., the float 31, provide an on-off valve. The on-off valve closes the ventilation passage which communicates the inside and the outside of the fuel tank 12 when the float 31 floats and rises. The on-off valve opens the ventilation passage when the float 31 descends.

A coupling mechanism 36 is formed between the floating body 33 and the holder 35. The coupling mechanism 36 is provided by a snap fit. The float 31 has a spring 37 disposed between the case 22 and the floating body 33. The spring 37 is disposed in a slightly compressed state. The spring 37 adjusts a buoyancy of the float 31.

The case 22 provides an opening 26 for the ventilation passage. The opening 26 is provided on the upper case 23. The opening 26 is provided in the ventilation passage. The opening 26 provides the ventilation passage. The opening 26 is provided on a relatively upper portion of the case 22. The opening 26 is provided on the vicinity of the fixed valve seat 25 in the height direction. The opening 26 is provided above the center of the case 22. An opening upper end VT of the opening 26 is close to the upper end surface of the fuel tank 12. An opening lower end VB of the opening 26 is above the lower end of the case 22. The opening lower end VB of the opening is above the center of the case 22. The opening 26 is provided intentionally to allow the fuel vapor and air to pass through. However, when the liquid level is disturbed, liquid components, i.e., a large amount of fuel or fuel droplets, may enter.

The case 22 has a plurality of openings 26 disposed along a circumferential direction on the outer wall of the upper case 23. The opening 26 is a main opening that provides the ventilation passage. The opening 26 has an opening area through which a large amount of gaseous components for adjusting the pressure of the fuel tank 12 can flow.

The case 22 has a barrier dome 29 at an exit portion of the ventilation passage. The barrier dome 29 captures fuel droplets. The barrier dome 29 acts to return the fuel droplets. Furthermore, the case 22 has a component placement portion 30 for functional components. The component placement portion 30 can be used to accommodate a relief valve, for example. The relief valve opens when the pressure in the fuel tank 12 reaches an abnormally high pressure. The relief valve may include a resin valve body or a steel ball valve body.

The lower case 28 includes a first plate member 41 and a second plate member 42. The first plate member 41 is provided on the opening 27. The first plate member 41 is joined to a lower end of the upper case 23. The first plate member 41 and the second plate member 42 are joined to each other. The first plate member 41 and the second plate member 42 form a valve chamber 43 between them. The valve chamber 43 is provided in a passage that communicates the float chamber and the lower end of the case 22. The first plate member 41 and the second plate member 42 are also valve cases.

Figure 3:
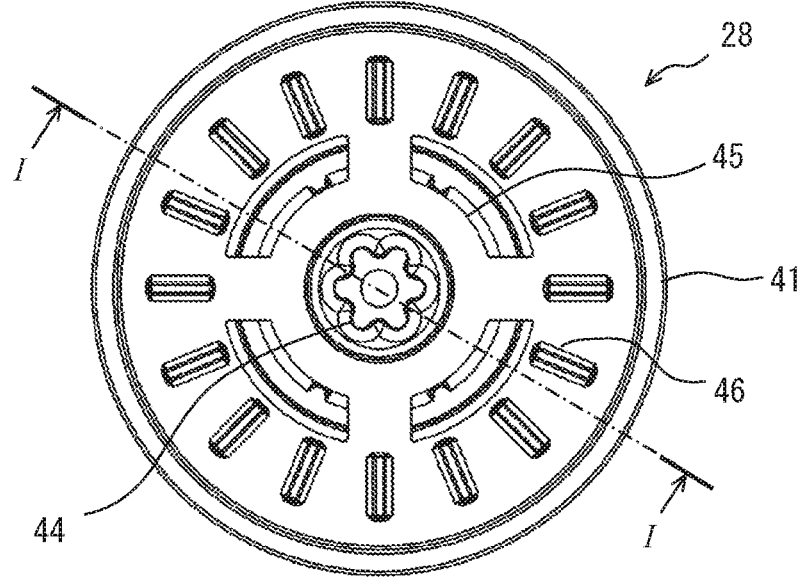
FIG. 3 is a top view of a valve case.

FIG. 3 is a plan view of the lower case 28 in an arrow symbol III in FIG. 1. In FIG. 1 and FIG. 3, the first plate member 41 has a guide member 44. The guide member 44 has a rod shape. The guide member 44 is located in the center of the float member 32 and extends from the bottom surface of the float chamber 32. The guide member 44 is a columnar member that protrudes vertically from the first plate member 41. The guide member 44 guides the float 31.

The first plate member 41 has an opening 45. The opening 45 is not blocked. The opening 45 has a fan shape. The first plate member 41 has a plurality of openings 45. The opening 45 is disposed on a radially outer side of the guide member 44. The opening 45 communicates the float chamber 32 and the valve chamber 43.

The first plate member 41 has a plurality of protrusions 46 for avoiding close contact with the float. The plurality of protrusions 46 form a plurality of grooves therebetween. The plurality of protrusions 46 are arranged radially outside the opening 45 in the radial direction. The plurality of protrusions 46 provide a passage for fuel by contacting the lower end surface of the float.

Returning to FIG. 1, the second plate member 42 has an opening 47 as a fuel inlet. The opening 47 is formed between the valve chamber 43 and the lower surface of the ventilation valve 2. A directional valve 51 is formed between the valve chamber 43 and the opening 47. The directional valve 51 restricts the fuel flow direction. The directional valve 51 allows the fuel to flow into the float chamber 32 and restricts the fuel that flows out from the float chamber 32. The directional valve 51 is provided by a check valve. The check valve allows the fuel flowing into the float chamber 32 and blocks the fuel flowing out from the float chamber 32. The valve chamber 43 accommodates a movable valve body 52. The valve body 52 is provided by a ball. The second plate member 42 provides a fixed valve seat 53 on which the valve body 52 is seated. The valve body 52 and the valve seat 53 provide a directional valve 51. The directional valve 51 allows the fuel to enter the float chamber 32 from the opening 47 and restricts the fuel discharge from the float chamber 32 to the opening 47. The directional valve 51 provides a part of the float control mechanism 61.

The second plate member 42 has a restricting rib 48. The second plate member 42 has a plurality of restricting ribs 48 which are radially disposed around the valve body 52. The restricting rib 48 provides a restricting member for restricting the movable direction of the valve body 52. The plurality of restricting ribs 48 allow a displacement of the valve body 52 in the vertical direction and restrict a displacement of the valve body 52 in the lateral direction. The vertical direction is a seating direction and a separating direction of the valve body 52 and the valve seat 53. The lateral direction is the shaking direction of the fuel tank 12. In other words, the plurality of restricting ribs 48 allow the movement of the valve body 52 due to the vertical movement of the liquid level, and restrict the movement of the valve body 52 due to the rolling of the fuel tank 12. As a result, the valve body 52 does not respond to the shaking of the fuel tank 12. The valve body 52 responds exclusively to the fuel flow.

The second plate member 42 has a fixed opening 49 which provides a fixed opening area. The fixed opening 49 is formed between the valve chamber 43 and the lower surface of the ventilation valve 2. The second plate member 42 provides a plurality of fixed openings 49. The fixed opening 49 is not opened or closed. Therefore, the fixed opening 49 functions as an inlet to the float chamber 32 and as an outlet from the float chamber 32. The fixed opening 49 provides a part of the float control mechanism 61.

Figure 4:
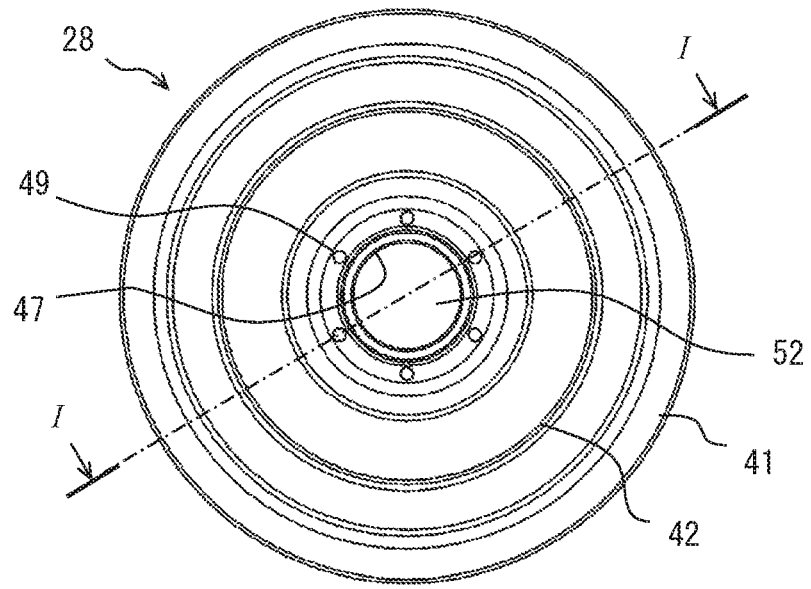
FIG. 4 is a bottom view of the valve case.

FIG. 4 is a plan view of the lower case 28 in an arrow symbol IV in FIG. 1. In FIG. 1 and FIG. 4, the opening 47 is disposed at the center of the second plate member 42. The plurality of openings 49 are annularly arranged on the radially outer side of the openings 47.

Returning to FIG. 1, the plurality of openings 49 provide a fixed communication area A49. In the directional valve 51, the valve body 52 is seated on the valve seat 53 in the closed state. The directional valve 51 provides a restricted area $A51r$ in the closed state. The restricted area $A51r$ is zero (0) or a very small area. The directional valve 51 provides an annular variable area $A51v$ in the opened state. The variable area $A51v$ is variable between the minimum variable area $A51\text{min}$ and the maximum variable area $A51\text{max}$. Therefore, the minimum variable area $A51\text{min}$ is equal to the restricted area $A51r$ ($A51r=A51\text{min}$). The maximum variable area $A51\text{max}$ is larger than the restricted area $A51r$ ($A51\text{max}>A51r$). The maximum variable area $A51\text{max}$ is larger than a communication area A49 ($A51\text{max}>A49$). In this embodiment, the restricted area $A51r$ is zero (0) ($A51r=A51\text{min}=0$).

When the liquid level in the fuel tank 12 rises, the fuel flows into the float chamber 32. At this time, the directional valve 51 and the fixed opening 49 provide the inflow area Ain. The inflow area Ain is the sum of the variable area $A51v$ and the communication area A49 ($\text{Ain}=A51v+A49$). When the liquid level in the fuel tank 12 is lowered, the fuel is discharged from the float chamber 32. At this time, the directional valve 51 and the fixed opening 49 provide the outflow area Aout. The outflow area Aout is the sum of the restricted area $A51r$ and the communication area A49 ($\text{Aout}=A51r+A49=A49$). The inflow area Ain is larger than the outflow area Aout ($\text{Ain}>\text{Aout}$).

As a result, the liquid level in the float chamber 32 rises rapidly but falls slowly. The rise in the liquid level in the float chamber 32 is substantially the same as the rise in the liquid level in the fuel tank 12. This "substantially the same"

includes a minute delay time inevitably caused by a flow resistance of the directional valve 51 and the fixed opening 49. The lowering of the liquid level in the float chamber 32 is delayed by a predetermined delay time from the lowering of the liquid level in the fuel tank 12. This "predetermined delay time" is a significant time of several seconds or more. The area difference between the inflow area Ain and the outflow area Aout creates a delay of a few seconds. The delay time is set in consideration of a decrease time during which the liquid level in the fuel tank 12 decreases to a level at which the fuel does not easily enter the opening 26. For example, the delay time is set longer than the decrease time. The float control mechanism 61 is provided by a directional valve 51 provided by the valve body 52 and the valve seat 53 and a fixed opening 49.

In FIG. 1, the ventilation valve 2 includes a barrier member 71. The barrier member 71 is made of resin. The barrier member 71 is disposed as a part of the case 22. The barrier member 71 is cylindrical. The barrier member 71 has a tapered cylindrical shape that gradually decreases in diameter from the bottom toward the top.

The barrier member 71 is disposed along an inner surface of the case 22. The barrier member 71 is disposed along an outer surface of the float 31. The barrier member 71 is provided between the opening 26 and the float 31 in the radial direction. The barrier member 71 extends from the case 22 below the opening 26. The barrier member 71 extends along the float 31. The barrier member 71 forms the float chamber 32 on the radially inner side of the opening 26. The barrier member 71 has a barrier upper end CT. The float chamber 32 formed by the barrier member 71 extends to above the opening upper end VT. Therefore, the fuel in the float chamber 32 may be stored above the opening upper end VT. The barrier upper end CT is located above the opening upper end VT (CT>VT). In other words, the barrier upper end CT is higher than the opening upper end VT. The barrier upper end CT is lower than the upper end of the float 31. The barrier upper end CT is lower than the valve seat position VF of the fixed valve seat 25 (CT<VF). The barrier member 71 is also called a cup.

The barrier member 71 extends higher than the opening 26. The barrier member 71 is located between the opening 26 and the float 31 and extends above the opening 26. The float 31 extends above the barrier upper end CT of the barrier member 71.

The barrier member 71 makes it possible to provide the opening 26 at a relatively high position. The barrier member 71 enables the opening 26 to be provided in a vicinity of the fixed valve seat 25 of the float valve 21. The barrier member 71 makes it possible to provide the opening upper end VT in a vicinity of the valve seat position VF. The term "vicinity" refers to the distance between the opening 26 and the valve seat position VF in the height direction. The term "vicinity" allows a relatively large flow rate in the ventilation passage.

The barrier member 71 captures fuel splashes that enter the float chamber 32 from the opening 26. The outer surface of the barrier member 71 acts to return the fuel to the opening 26. The outer surface of the barrier member 71 is inclined so that the outer diameter increases from the top to the bottom. This inclination prevents the flow of the fuel from the bottom to the top. The slope facilitates the fuel flow from the top to the bottom.

Further, the barrier member 71 is located between an inner surface of the case 22 and the float 31. The barrier member 71 extends along the height direction between the inner surface of the case 22 and the float 31. For this reason, the barrier member 71 suppresses a hydrodynamic action on the float 31 due to the flow of the fuel vapor including the gaseous component of the fuel and air. The fuel vapor flows from the opening 26 toward the fixed valve seat 25. This flow has a hydrodynamic effect on behaviors of the float 31. For example, the flow may give lifting force to the float 31.

Figure 5:
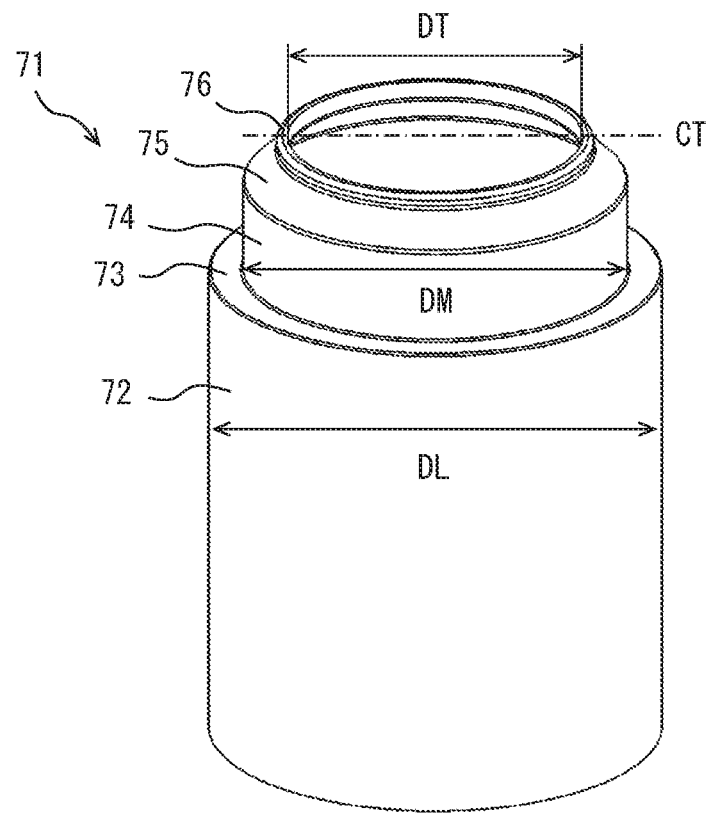
FIG. 5 is a perspective view of a barrier member.

FIG. 5 shows the barrier member 71. The barrier member 71 has a stepped cylindrical shape. The barrier member 71 has a lower portion 72. The lower portion 72 has an outer diameter DL. The barrier member 71 has an intermediate portion 74 positioned to face the opening 26. The intermediate portion 74 has an outer diameter DM. The outer diameter DM is smaller than the outer diameter DL. A stepped portion 73 is formed between the lower portion 72 and the intermediate portion 74 and connects them. The barrier member 71 has an inclined portion 75 that extends above the intermediate portion 74. The inclined portion 75 is inclined so that the outer diameter gradually decreases upward from the intermediate portion 74. The barrier member 71 has a tip edge 76 at a distal end of the inclined portion 75. The tip edge 76 provides an opening with an inner diameter DT. The tip edge 76 defines a barrier upper end CT of the barrier member 71.

The inclined portion 75 makes it possible to arrange the barrier member 71 long along the float 31. Further, the inclined portion 75 suppresses entering of the fuel from the tip edge 76 of the barrier member 71 when the fuel tank 12 is inclined and the liquid level is inclined.

In FIG. 1, the lower portion 72 extends along the inner surface of the upper case 23. The lower portion 72 functions as a support portion for supporting the barrier member 71. On the other hand, the stepped portion 73, the intermediate portion 74, the inclined portion 75, and the tip edge 76 provide a barrier against the flow from the opening 26 toward the fixed valve seat 25.

Figure 6:
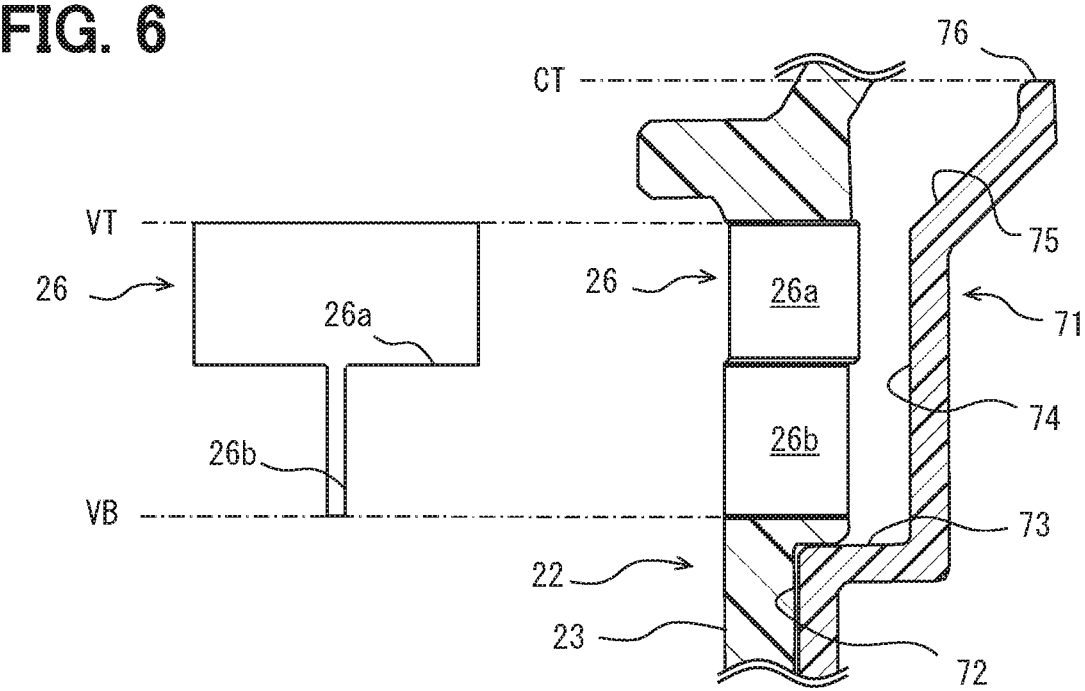
FIG. 6 is a composite view showing a relationship between a ventilation opening and the barrier member.

FIG. 6 is a plan view of the opening 26 in an arrow symbol VI in FIG. 1. The drawing shows a positional relationship between the opening 26 and the barrier member 71. The intermediate portion 74 is located on a radial inner side of the opening 26. In other words, the opening 26 is located on the radial outer side of the intermediate portion 74. The barrier member 71 is positioned away from the case 22. The opening upper end VT of the opening is located at the boundary between the intermediate portion 74 and the inclined portion 75. The opening lower end VB is located at the lower end of the intermediate portion 74. The opening lower end VB is located so that the fuel flowing along the barrier member 71 is discharged out of the case 22. The opening lower end VB is substantially at the same height as the stepped portion 73 in the height direction. The term "substantially at the same height" is intentionally defined to discharge the fuel. The term "substantially at the same height" is defined so that a large amount of the fuel does not accumulate between the case 22 and the barrier member 71. Thereby, the fuel flowing down along the outer surface of the barrier member 71 is discharged from the opening 26.

The opening 26 has a main opening 26a and a sub opening 26b located below the main opening 26a. The main opening 26a is square or rectangular. The sub opening 26b has a slit shape or a groove shape. The main opening 26a and the sub opening 26b are arranged in a T shape. The sub opening 26b extends along the height direction. The sub opening 26b is formed continuously with the main opening 26a. The opening areas of the main opening 26a and the sub opening 26b are set as main passages for air and the fuel vapor. The sub opening 26b allows the fuel to be discharged by providing the lower end VB. Further, the main opening 26a is located above the sub opening 26b. Thereby, entering of the fuel droplets from the opening 26 is suppressed.

Operation

The operation of the ventilation valve 2 will be described with reference to FIG. 1. When the fuel level is at the low level FLL lower than that of the ventilation valve 2, the float 31 and the valve body 52 are seated at the illustrated positions. The seal member 34 is separated from the fixed valve seat 25. At this time, the ventilation valve 2 opens the ventilation passage and communicates the inside and the outside of the fuel tank 12 through the path indicated by the arrow in the drawing.

When the fuel level rises, the ventilation valve 2 may be immersed in the fuel. In this case, the fuel enters the float chamber 32. At this time, the fuel passes through the plurality of fixed openings 49 and the direction valve 51. When the fuel enters the float chamber 32, the float 31 floats on the fuel. As a result, the position of the float 31 in the height direction varies according to the liquid level. The relatively large opening area provided by the plurality of fixed openings 49 and the directional valve 51 does not cause a time delay between the fluctuation in the liquid level in the fuel tank 12 and the fluctuation in the liquid level in the float chamber 32. When the liquid level reaches a predetermined height, i.e., the cut-off point, the float 31 presses the seal member 34 against the fixed valve seat 25. As a result, the float valve 21 closes the ventilation passage.

If the liquid level is disturbed before the float valve 21 closes the ventilation passage, fuel droplets may enter through the opening 26. In this case, the barrier member 71 prevents the flow of fuel from splashing. Further, the barrier member 71 promotes discharging of the fuel. Further, the opening lower end VB is located at a height substantially equal to the stepped portion 73. Therefore, the fuel discharge is promoted. The barrier upper end CT is higher than the opening upper end VT. This arrangement also facilitates capturing of the fuel droplets and the fuel discharge. Further, the tapered barrier member 71 provides an outer surface that is long in the vertical direction. Thus, the tapered shape facilitates capturing of the fuel droplets and the fuel discharge.

The fuel level may further rise and reach a high liquid level FLH. In this case, the liquid level reaches the opening 26. However, before the fuel reaches the high liquid level FLH, the float valve 21 has already closed the ventilation passage. Therefore, the fuel does not leak into the ventilation passage.

The fuel may drop from the high liquid level FLH or the cut-off point. In other words, the liquid level may drop after the seal member 34 is seated on the fixed valve seat 25. In this case, the fuel in the float chamber 32 flows out from the plurality of fixed openings 49. At this time, the directional valve 51 does not open.

When the liquid level in the fuel tank 12 is slowly lowered, the liquid level in the float chamber 32 is lowered together with the liquid level in the fuel tank 12. When the liquid level in the fuel tank 12 lowers quickly, the liquid level in the float chamber 32 falls more slowly than the liquid level in the fuel tank 12. This is because the plurality of fixed openings 49 function as orifices. At this time, the directional valve 51 does not open. Moreover, since the directional valve 51 has the restricting rib 48, the directional valve 51 does not respond to shaking of the fuel tank 12. As a result, the directional valve 51 does not open even when the fuel tank 12 is shaken. As a result, even if the fuel tank 12 is shaken, the liquid level in the float chamber 32 slowly descends in a delayed manner from descending of the liquid level in the fuel tank 12.

Due to a throttling action provided by the plurality of fixed openings 49, descending of the liquid level in the float chamber 32 is delayed from descending of the liquid level in the fuel tank 12. As a result, the liquid level in the float chamber 32 is lowered so as to follow a lowering of the liquid level in the fuel tank 12. In other words, the liquid level in the fuel tank 12 falls quickly than that of the liquid level in the float chamber 32.

When the liquid level in the float chamber 32 falls below a predetermined level, the float 31 pulls the seal member 34 away from the fixed valve seat 25. As a result, the float valve 21 opens the ventilation passage. When the liquid level in the float chamber 32 is lowered to a predetermined level, the liquid level in the fuel tank 12 is lowered earlier than the predetermined level. For this reason, the fuel in the fuel tank 12 hardly reaches the opening 26. As a result, a fuel leakage from the fuel tank 12 is suppressed.

Since the fuel in the float chamber 32 contacts the float 31 and the barrier member 71, the liquid level is not easily disturbed. Moreover, the barier member 71 is tapered. Therefore, the disturbance of the liquid level is suppressed. As a result, the fuel in the float chamber 32 hardly reaches the fixed valve seat 25.

According to the embodiment described above, the float control mechanism 61 controls the fuel in the float chamber 32 to easily flow in and not easily flow out. Thereby, the float valve 21 hardly leaks the fuel is provided. Moreover, the directional valve 51 is formed so as not to respond to the shaking of the fuel tank 12. As a result, even when the fuel tank 12 shakes, the float valve 21 can be controlled according to the liquid level of the fuel tank 12.

According to the embodiment described above, the barrier member 71 is provided on the radially inner side of the opening 26 that provides the ventilation passage. As a result, even if the opening 26 is provided in the vicinity of the fixed valve seat 25, the inflow of the fuel from the opening 26 is suppressed. Moreover, the barrier member 71 is formed in the tapered cylindrical shape. As a result, capturing of the fuel and returning of the captured fuel are promoted.

Second Embodiment

This embodiment is a modified example based on the foregoing embodiment. This embodiment contributes to at least one of a reduction in a number of parts, a reduction in an amount of resin material, and a reduction in weight. Furthermore, this embodiment contributes to cost reduction. In this embodiment, a simplified fuel tank ventilation valve 2 is provided.

Figure 7:
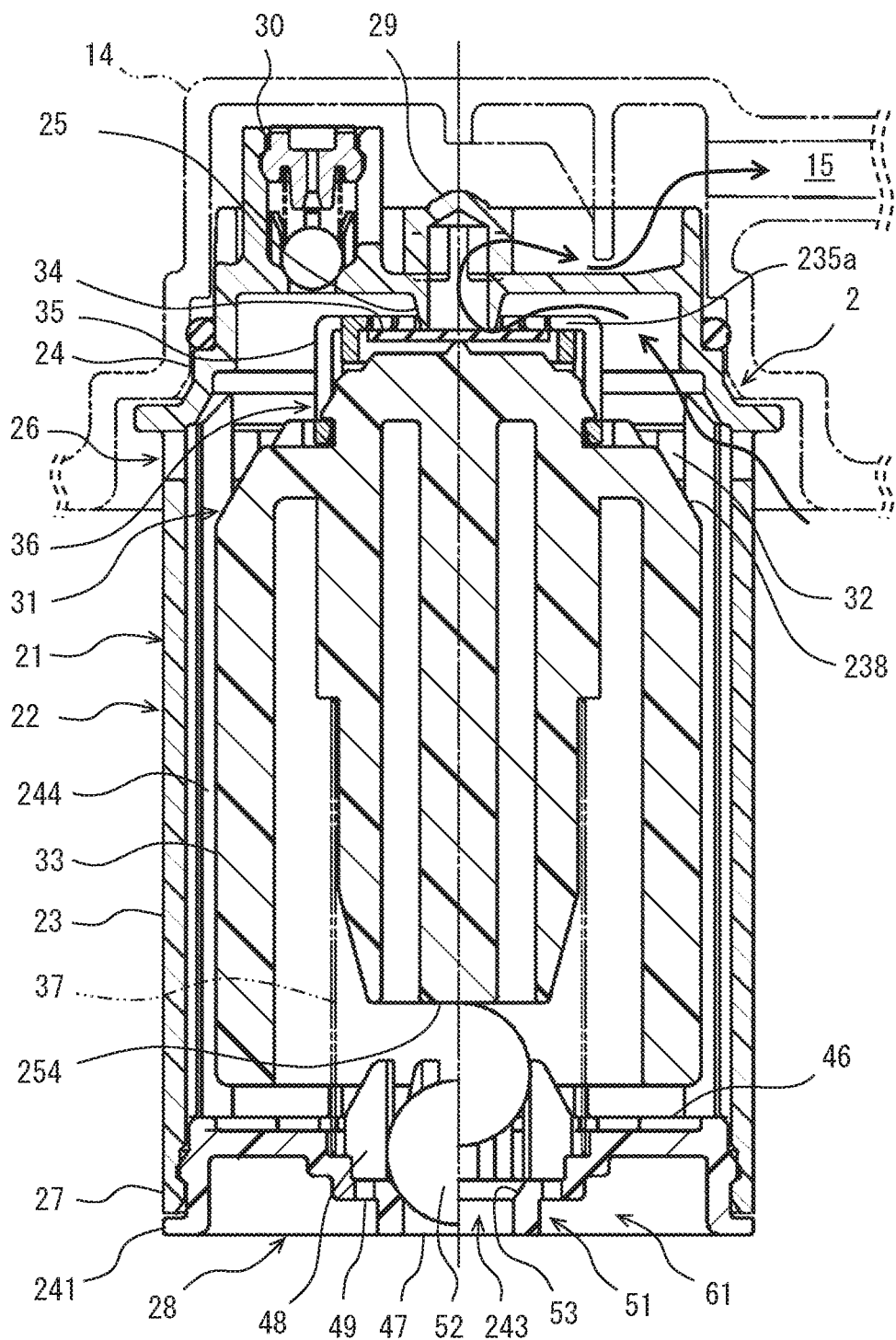
FIG. 7 is a cross-sectional view of a fuel tank ventilation valve according to a second embodiment.

In FIG. 7, the left half shows a state where the valve body 52 is seated on the valve seat 53. In FIG. 7, the right half shows a state where the valve body 52 is lifted maximum from the valve seat 53. The fuel tank ventilation valve 2 of this embodiment does not include the barrier member 71. The floating body 33 has a slope 238 on a shoulder portion. The slope 238 extends from a radial outermost portion of the floating body 33. The slope 238 provides a frustoconical annular outer surface. The slope 238 continues to a step for the coupling mechanism 36. The slope 238 guides a flow of air and the fuel toward the fixed valve seat 25. The slope 238 enables the fuel that has reached a periphery of the fixed valve seat 25 to flow down smoothly. In addition, the slope 238 keeps a position of the liquid surface away in a radial outward direction from the fixed valve seat 25 located on the central axis. In this embodiment, even if the opening 26 is provided in the vicinity of the fixed valve seat 25, the inflow of the fuel from the opening 26 is suppressed.

In the preceding embodiment, a radial position of the float 31 is defined by the guide member 44 vertically extending from the first plate member 41. The structure of the preceding embodiment is also referred to as a center support structure with respect to the float 31 support. Alternatively, the radial position of the float 31 may be defined by the guide member 244 provided on an inner surface of the case 22. The case 22 has a plurality of guide members 244 on the inner surface. The guide member 244 is formed so as to protrude radially inward from the inner surface of the case 22. The guide member 244 is formed in a range facing the float 31 on the inner surface of the case 22. The guide member 244 extends in the vertical direction along the inner surface of the case 22. The guide members 244 are positioned at equal intervals or unequal intervals on the inner surface of the case 22. The guide member 244 can contact an outer surface of the floating body 33. The guide member 244 contacts the outer surface of the floating body 33 so that the float 31 can be moved in the vertical direction, and is held on the central axis in the case 22.

In the preceding embodiment, the valve chamber 43 is formed between the first plate member 41 and the second plate member 42. Alternatively, in this embodiment, the valve chamber 243 is exclusively formed by the first plate member 241. The fuel tank ventilation valve 2 does not include the second plate member 42. The first plate member 241 closes the lower end of the upper case 23 except for the opening 47 and the opening 49. The first plate member 241 provides a lower end lid.

The movement of the valve body 52 is restricted in a downward direction and in a lateral direction by the first plate member 241. The restriction rib 48 restricts the movement in the lateral direction. In particular, the restriction rib 48 restricts the movement of the valve body 52 in the lateral direction so that the valve body 52 is not separated from the valve seat 53 only by the normal roll assumed for the fuel tank ventilation valve 2. The height of the restriction rib 48 is set so as to hold the valve body 52 in the valve chamber 243 even when the float 31 is moved to the uppermost position. The stopper member 254 is a part of the floating body 33. The stopper member 254 is a rod-shaped member located on the central axis of the float 31. The lower surface of the stopper member 254 is positioned so as to face the valve body 52. The movement of the valve body 52 is restricted in the upward direction by the stopper member 254.

The holder 35 connects the seal member 34 to the floating body 33. The holder 35 covers an outer peripheral portion of the seal member 34 from an upper surface of the seal member 34. As a result, the holder 35 is fixed to the floating body 33. The seal member 34 is held in a gap between the floating body 33 and the holder 35. The holder 35 has a notch portion 235a in a part of the upper surface. The notch portion 235a is located at a part of an annular member surrounding the seal member 34. The notch portion 235a extends in a radial direction. The notch portion 235a extends in a downward direction from the upper surface of the holder 35. The notch portion 235a has openings at both ends on a radial inner side and a radial outer side. The notch portion 235a has a groove shape having an opening in an upward direction. The bottom surface of the notch portion 235a is located at a height position equivalent to a top surface of the seal member 34 or at a height position lower than the top surface of the seal member 34. In other words, the bottom surface of the notch portion 235a is positioned below the top surface of the seal member 34. The notch portion 235a is formed so as to leave an annular portion in the holder 35. The annular portion is located below the notch portion 235a. The annular portion of the holder 35 contributes to give the holder 35 a desired mechanical strength. The notch portion 235a provides a discharge path for the liquid fuel to flow down from above the seal member 34. The holder 35 provides a substantially C-shaped bank on the seal member 34. The holder 35 may include a plurality of notch portions 235a.

When the fuel reaches the seal member 34, the fuel flows down from the top surface of the seal member 34 through the notch portion 235a. The notch portion 235a suppresses fuel accumulation on the seal member 34. Thereby, generating a gum substance on the sealing member 34 and accumulating foreign materials on the sealing member 34 are suppressed. Moreover, a situation where the fuel accumulated on the seal member 34 flows out to the passage pipe 15 beyond the fixed valve seat 25 is suppressed.

Also in this embodiment, the float control mechanism 61 is formed in the case 22 below the opening 26 as the ventilation opening. The float control mechanism 61 makes the inflow area Ain where the fuel flows into the float chamber 32 larger than the outflow area Aout where the fuel flows out from the float chamber 32 (Ain>Aout). The float control mechanism 61 includes a directional valve 51 that responds to inflow and outflow of fuel from the lower end of the float chamber 32. The float control mechanism 61 has an opening 47 that is opened and closed by the directional valve 51. The float control mechanism 61 has an opening 49 at the lower end of the float chamber 32. The opening 49 constantly communicates the float chamber 32 with the outside. Also in this embodiment, the same effects as those of the preceding embodiments can be obtained.

Third Embodiment

This embodiment is a modified example based on the foregoing embodiment. In the above embodiment, the notch portion 235a extends downward from the upper surface of the holder 35. Alternatively, in this embodiment, a notch portion 335a extending upward from the lower surface of the holder 35 is formed.

Figure 8:
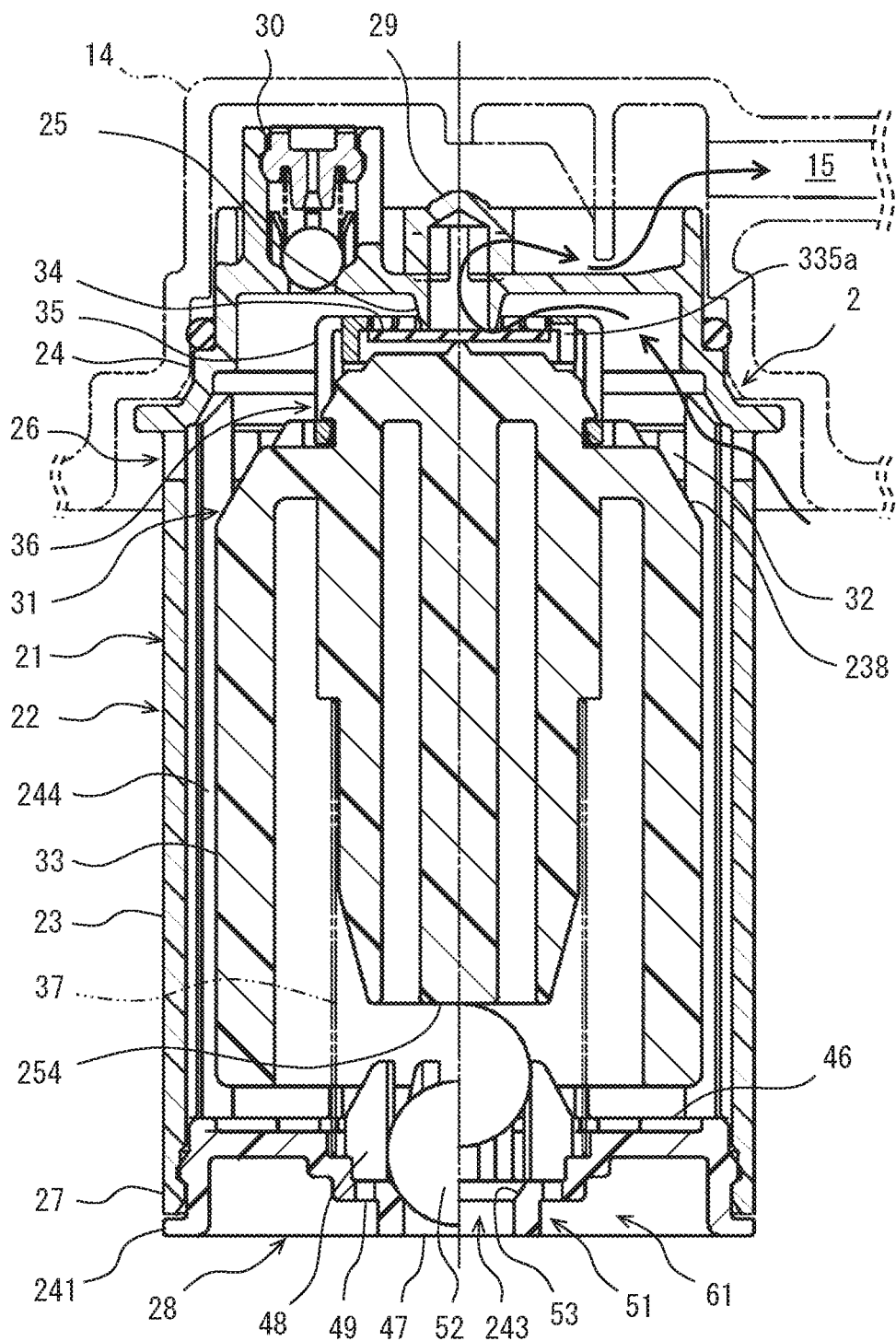
FIG. 8 is a cross-sectional view of a fuel tank ventilation valve according to a third embodiment.

In FIG. 8, the holder 35 has a notch portion 335a in a part of the lower surface. The notch portion 335a is formed so as to extend upward from the lower surface of the holder 35. A ceiling surface of the notch portion 335a is located at a height position equivalent to the upper surface of the seal member 34 or at a height position higher than the upper surface of the seal member 34. In other words, the ceiling surface of the notch portion 335a is located above the upper surface of the seal member 34. The notch portion 335a has a groove shape having an opening in the downward direction. The notch portion 335a is formed so as to leave an annular portion in the holder 35. The annular portion is located above the notch portion 335a. Also in this embodiment, the notch portion 335a suppresses fuel accumulation on the upper surface of the seal member 34.

Other Embodiments

The disclosure in this specification, the drawings, and the like is not limited to the illustrated embodiments. The disclosure encompasses the illustrated embodiments and variations thereof by those skilled in the art. For example, the disclosure is not limited to the parts and/or combinations of elements shown in the embodiments. The disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

In the above embodiment, the float 31 includes the rubber seal member 34. Alternatively, the seal member 34 may be made of a resin such as an elastomer. Further, the float 31 may have a part of the floating body 33 in direct contact with the fixed valve seat 25.

In the above embodiment, resin is used for many parts of the case 22 and the float 31. The resin can be selected from various resins having fuel resistance and heat resistance. For example, a resin called engineering plastic such as POM can be used as the resin.

In the above embodiment, the directional valve 51 uses a ball made of steel balls as the valve body 52. Alternatively, the directional valve 51 may be a resin ball. Further, a metal or resin plunger may be used as the valve body 52. Furthermore, the direction valve 51 may include an urging member such as a spring that applies a preload in the valve closing direction. Furthermore, the direction valve 51 may be provided by a flap-type resin plate, a flap-type rubber plate, or a duckbill.

In the above embodiment, the float control mechanism 61 is provided by the directional valve 51 and the plurality of fixed openings 49. Alternatively, the float control mechanism 61 may be provided by the directional valve 51 and its bleed port. The bleed port can be provided by a through hole formed in the valve body 52 or a groove formed on the valve seat 53. The bleed port provides a restricted area A51r that is not zero (0). In this case, the restricted area A51r provides a communication area A49. In this case, the float control mechanism 61 can be provided only by the directional valve 51. Further, instead of the plurality of fixed openings 49, one fixed opening 49 may be provided.

In the above embodiment, the ventilation valve 2 is connected to the lid 14. Alternatively, the ventilation valve 2 may be connected to a flange of a pump module which is capable of supporting the pump. Further, the ventilation valve 2 may be connected to a cap welded to the fuel tank 12 or a bracket fixed to the fuel tank 12.

In the above embodiment, the opening 26 is T-shaped. Alternatively, the main opening 26a and the sub opening 26b may be made in independent separate openings. For example, the sub opening 26b can be provided by an independent opening that provides the opening lower end VB. The main opening 26a and the sub opening 26b can be provided in various shapes such as a quadrilateral, a quadrangle, a circle, an oval, and an ellipse.

In the above embodiment, the barrier member 71 includes the inclined portion 75. Alternatively, a multi-step staircase may be provided. Also in this case, a tapered portion of the barrier member 71 can be provided between the case 22 and the float 31. Further, the barrier member 71 is gradually reduced in diameter from the bottom to the top. Alternatively, the barrier member 71 may be continuously reduced in diameter.

In the second embodiment and the third embodiment, the notch portion 235a or the notch portion 335a is adopted. The notch portion 235a or the notch portion 335a forms a groove-shaped discharge path on the holder 35. Alternatively, the holder 35 can be provided with a notch that forms a through-hole-like discharge path. In this case, the notch portion has openings only at both ends in the radial direction.

What is claimed is:

1. A fuel tank ventilation valve comprising:
   a float configured to float on fuel;
   a case configured to define a float chamber for containing the float and storing fuel for floating the float;
   an on-off valve that closes a ventilation passage that communicates an inside and an outside of a fuel tank when the float floats and rises, and opens the ventilation passage when the float descends;
   a ventilation opening formed on the case and providing the ventilation passage; and
   a float control mechanism that is formed on the case below the ventilation opening and the float, and the float control mechanism includes:
      a fixed opening that is formed on a bottom portion of the float chamber and defines an outflow area through which fuel flows out from the float chamber; and
      a directional valve having a directional valve opening that is formed on the bottom portion of the float chamber, wherein
   the directional valve is configured to block fuel flowing out of the float chamber through the directional valve opening,
   the directional valve is further configured to allow fuel to flow into the float chamber through the directional valve opening, and
   the directional valve defines an inflow area that is larger than the outflow area.

2. The fuel tank ventilation valve according to claim 1, wherein the directional valve includes:
   a valve body;
   a valve seat; and
   a restricting member that allows displacement of the valve body in a vertical direction and restricts displacement of the valve body in a lateral direction.

3. The fuel tank ventilation valve according to claim 2, wherein the restricting member includes a plurality of restricting ribs arranged radially around the valve body.

4. The fuel tank ventilation valve according to claim 1, wherein the directional valve is a check valve.

5. The fuel tank ventilation valve according to claim 1, further comprising a barrier member provided between the ventilation opening and the float.

* * * * *